United States Patent [19]

Boettcher

[11] 3,984,082
[45] Oct. 5, 1976

[54] SELF-STOWING JACK
[76] Inventor: Richard W. Boettcher, 18483 Ravenwood Drive, Saratoga, Calif. 95070
[22] Filed: Apr. 28, 1975
[21] Appl. No.: 572,014

[52] U.S. Cl. .................................. 254/86 R
[51] Int. Cl.² ................................. B66F 7/26
[58] Field of Search .......... 254/86 R, 86 H, 45–47; 280/150.5

[56] References Cited
UNITED STATES PATENTS

| | | | |
|---|---|---|---|
| 1,988,304 | 1/1935 | Duman | 254/86 R |
| 2,194,594 | 3/1940 | Malley | 254/86 H |
| 2,442,881 | 6/1948 | Soskin | 254/86 H |
| 2,837,312 | 6/1958 | Troche | 254/86 H |
| 3,362,683 | 1/1968 | Hansen | 254/86 H |
| 3,817,493 | 6/1974 | Hanser | 254/86 R |

Primary Examiner—Al Lawrence Smith
Assistant Examiner—Robert C. Watson
Attorney, Agent, or Firm—Lowhurst & Aine

[57] ABSTRACT

In a self-stowing motorized jack, a pair of elongated axially telescoping members are arranged to be driven lengthwise relative to each other to lift the vehicle to which they are attached, and when retracted, to move into a self-stowing position. The telescoping members are pivoted at one end to the vehicle to be lifted or leveled. A cam is affixed to the vehicle and a cam follower is affixed to a retractable one of the telescoping members of the jack so that the cam follower, when retracted into engagement with the cam causes the retracted telescoping members to pivot about the pivot into a stowed horizontal position. Automatic latches are arranged for latching the telescoping jack members in both the stowed and lifting positions.

8 Claims, 8 Drawing Figures

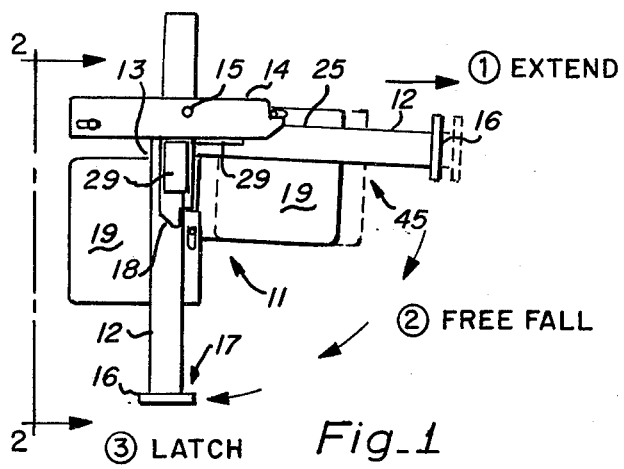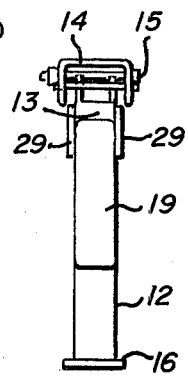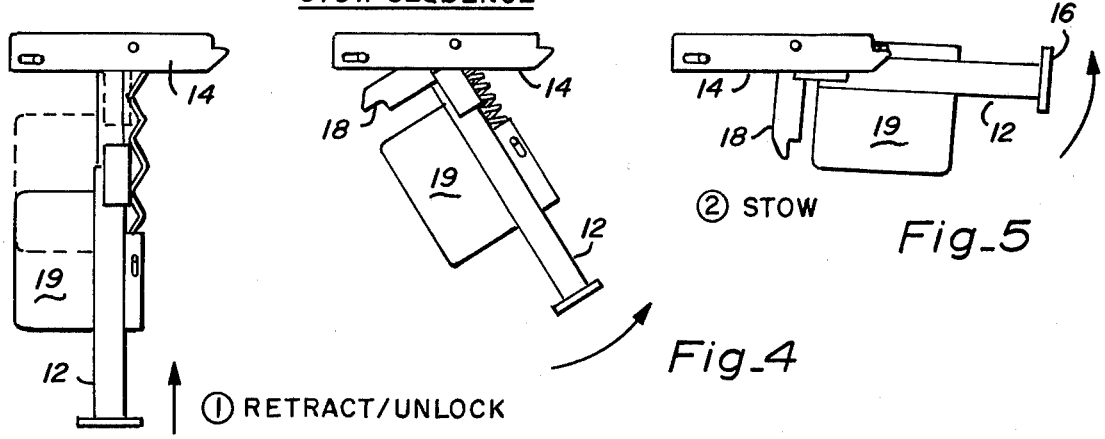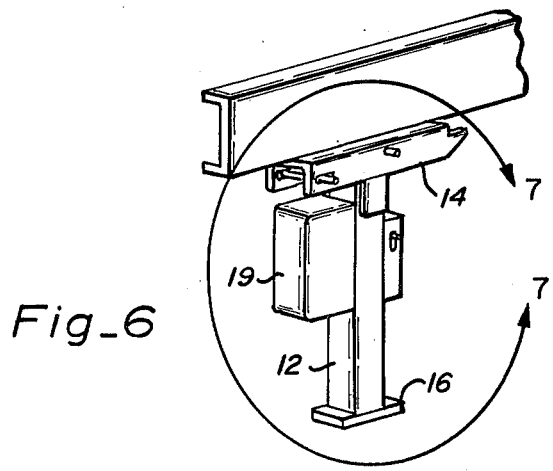

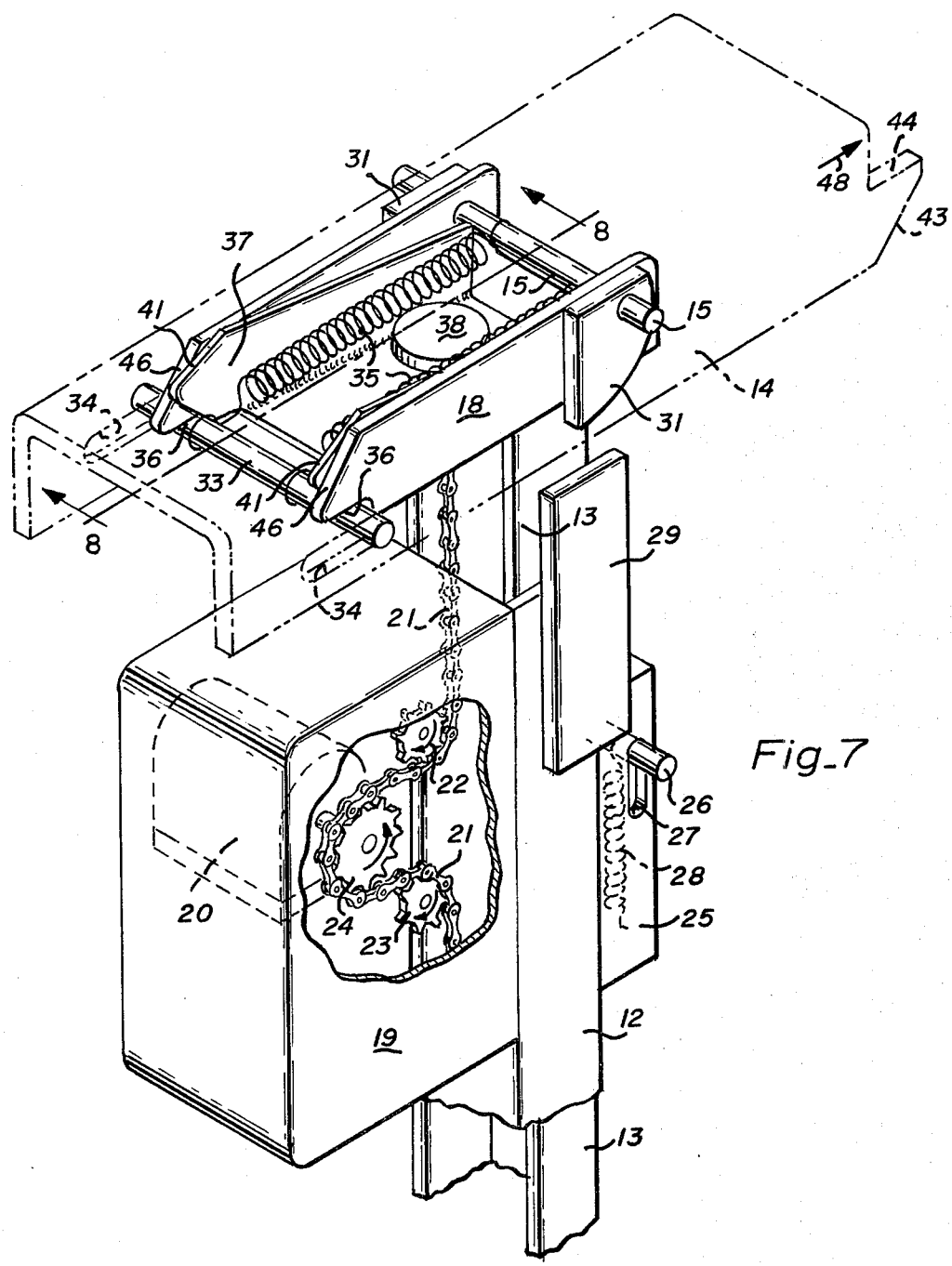
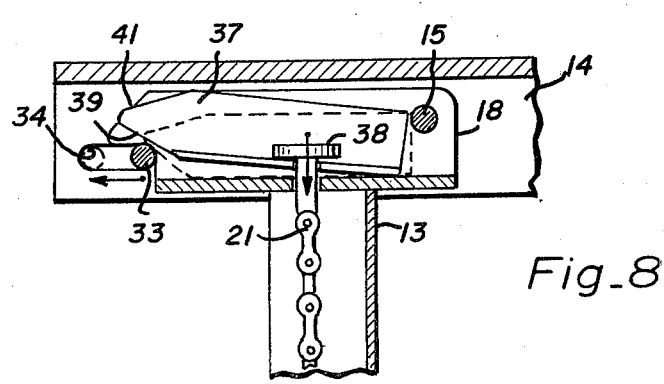

SELF-STOWING JACK

BACKGROUND OF THE INVENTION

The present invention relates in general to motorized jacks of the telescoping variety, such jacks having a self-stowing capability when not in use.

DESCRIPTION OF THE PRIOR ART

Heretofore, motorized telescoping jacks have been provided for leveling campers, motor homes, and travel trailers. An example of such a jack is disclosed and claimed in U.S. Pat. No. 3,679,174 issued July 25, 1972.

These prior art motorized jacks were manually pivoted about a pivotable connection to the vehicle to which they were attached for stowing. In the case of a camper, the jacks are readily accessible and at reasonable elevation above the ground so that the operator may with ease manually pivot the jacks between the lifting and the stowed positions. However, in the case of the use of such jacks on motor homes and travel trailers the jacks are quite often positioned under the vehicle in such a manner that they are not readily accessible to the operator. Thus it would be desired to have a self-stowing motorized jack of the telescoping type for use in applications where access by the operator to the jacks is not readily obtainable.

SUMMARY OF THE PRESENT INVENTION

The principal object of the present invention is the provision of a self-stowing telescoping jack.

In one feature of the present invention, cooperative structure operatively associated with at least one of the telescoping members of the jack is responsive to retractive relative movement of the telescoping members for pivoting the telescoping members about a pivot into a stowed position.

In another feature of the present invention, the self-stowing cooperative structure for pivoting the telescoping jacks into a stowed position includes a cam and a cam follower one of which is arranged for mounting to the vehicle and the other of which is arranged to be mounted to the telescoping jack structure such that, when the telescoping jack structure is retracted sufficiently, operative engagement is obtained between the cam and the cam follower to cause the telescoping jack structure to pivot about the pivotable connection into the stowed position.

In another feature of the present invention a self-latching structure is provided in cooperative association with the telescoping jack structure for latching the telescoping jack structure in the stowed position.

In another feature of the present invention, a self-latching latch is provided in cooperative association with the telescoping jack structures for latching the telescoping jack structures in the vertical or lifting position.

Other features and advantages of the present invention will become apparent upon a perusal of the following specification taken in connection with the accompanying drawings wherein:

BRIEF DESCRIPTION OF THE DRAWINGS

FIG. 1 is a side elevational self-stowing jack in both the lifting and stowed positions, such jack incorporating features of the present invention, FIG. 2 is an end elevational view of the structure of FIG. 1 taken along line 2—2 in the direction of the arrows, FIG. 3 is a view similar to that of FIG. 1 depicting the jack in the lifting position, FIG. 4 is a side elevational view of the jack of FIG. 3 showing the jack in an intermediate position in the self-stowing sequence, FIG. 5 is a view similar to that of FIG. 4 showing the self-stowing jack in the stowed position, FIG. 6 is a perspective view of a self-stowing jack of the present invention as fixed to a vehicle to be lifted, FIG. 7 is an enlarged perspective view, partly broken away, of a portion of the structure of FIG. 6 delineated by line 7—7, and FIG. 8 is a reduced sectional view of a portion of the structure of FIG. 7 taken along lines 8—8 in the direction of the arrows.

DESCRIPTION OF THE PREFERRED EMBODIMENTS

Referring now to FIGS. 1, 2 and 7 there is shown a self-stowing telescoping jack assembly 11 incorporating features of the present invention. The jack assembly 11 includes a pair of telescoping jack members 12 and 13 which are pivotably secured within a channel member 14 via an axle 15 passing laterally of the channel 14. The channel 14 is affixed to the chassis of the vehicle to be lifted or leveled in the manner as indicated in FIG. 6. A foot portion is affixed to the lower end of the outer tubulation telescoping member 12 for resting upon the ground when the jack is in the lifting position as indicated at 17. The upper telescoping member 13 is a channel member of generally L-shape having a laterally directed channel portion 18 fixedly secured to the upper end of a lower telescoping portion 13.

A reversible motor is provided within a transmission housing 19 laterally extending and securely affixed to the lower tubular telescoping member 12. A sprocket chain 21 has one end thereof affixed to the upper end of the upper telescoping channel member 13 and the other end thereof fixedly secured to the lower end thereof. Inside the housing 19, the chain 21 passes around two idler sprockets 22 and 23 and a loop portion of the chain 21 extends laterally around a drive sprocket 24 fixedly secured to the output shaft of the reversible motor 20 so that energization of the motor causes the two telescoping jack members 12 and 13 to move in axially telescoping relation relative to each other in variable accordance with movement of the housing 19 and lower tubular member 12 along the chain 21. This type of jack is disclosed in the aforecited U.S. Pat. No. 3,679,174.

A stow housing 25 is affixed to the lower tubular member 12 on a side thereof opposite to that of the motor housing 19. A stow shaft 26 extends outwardly of the stow housing 25 through an elongated slot 27 in the wall of the housing 25, such slot being elongated in a direction parallel to the axis of elongation of the telescoping tubular jack member 12. A spring 28 is contained within the stow housing 25 and serves to spring bias the stow shaft 26 toward the upper end of the elongated slot 27, i.e., toward the end closest to the pivot shaft 15.

A pair of stow cam follower plates 29 are fixedly secured as by welding to opposite sides of the lower tubular telescoping member 12. A pair of quadrant shaped cams 31 are fixedly secured as by welding to the inside of the narrow side walls of the channel 14. The pivot shaft 15 passes through aligned apertures in the lateral channel portion 18, the cam 31 and the side wall of the channel 14.

A latch shaft 33 extends laterally of the channel 14 through a pair of longitudinally directed slots 34 in the narrow side walls of the channel 14. The latch shaft 33 is spring biased to the end of the slots 34 closest to the pivot shaft 15 via a pair of coil springs 35 connected at one end to the pivot shaft 15 and at the other end to the latch shaft 33. The outer end of the transversely directed portion 18 of the upper telescoping jack member 13 includes a longitudinally directed notch portion 36 disposed in generally vertical registration with the latch slots 34 but having a shorter axial extent than the latch slots 34 for latching the L-shaped upper jack member 13 to the channel structure 14 when the telescoping members 12 and 13 are in the lifting or vertical position.

An inverted channel shaped latch release member 37 (see FIGS. 7 and 8) is carried within the channel portion 18 of the upper jack member 13. The release member 37 includes a central aperture to receive a bolt 38 which also passes through an aligned aperture in the transverse channel member 18. The lower end of the bolt 38 is fixedly secured to the upper end of the chain 21, as best shown in FIG. 8. The outer end of the release member 37, which is disposed adjacent the latch shaft 33, has a downwardly and inwardly inclined ramp portion 39 which rides on the spring biased latch shaft 33.

The upper end of the release member 37 has an upwardly and inwardly directed lip 41 which is inside of a similarly shaped ramp 46 at the end of the channel 18.

The other end of the channel 14 (see FIG. 7) includes an upwardly and outwardly directed inclined stow ramp 43 which receives the stow shaft 26 as the telescoping jack members 12 and 13 are pivoted to the stow position which is generally horizontal and parallel to the channel 14. When the spring biased stow shaft 40 has traversed the stow ramp 43 to the upper end thereof an inwardly directed notch portion 44 of the ramp 43 permits the spring biased stow shaft to catch behind the stow ramp 43 and thereby latch the telescoping jack members 12 and 13 in the stowed position as shown at 45 in FIG. 1.

In operation, the jack assembly 11 is unstowed (see FIGS. 1 and 2) by energizing the reversible motor 20 so as to extend the telescoping jack members 12 and 13. As the lower tubular telescoping jack member 12 travels in the extending direction, the stow shaft 26 will ride over the upper lip 44 of the stow ramp 43 so as to release the telescoping jack members 12 and 13 from the stowed position. The released jack members 12 and 13 then, by gravity forces, pivot about the pivot shaft 15 to the vertical or lift position. As the extending jack structure 11 pivots into the vertical position the upper ramp on the end of the laterally extending portion 18 of the upper jack member 13 pushes the latch shaft 33 away from the pivot shaft 15 to permit the jack structure 11 to rotate fully to the vertical or lifting position. When the jack has reached the vertical or lifting position the notch 36 in the channel 18 permits the spring biased latch shaft to move into the latching position for latching the telescoping jack members 12 and 13 in the vertical or lifting position.

The reversible motor 20 continues to extend the telescoping jack members 12 and 13 into engagement with the ground to effect leveling or lifting of the vehicle. More than one jack may be under the control of a central controller for automatic leveling of the vehicle.

When the jack 11 is to be stowed, the reversible motor 20 is energized to retract the telescoping jack members 12 and 13. The telescoping retraction is continued until the cam follower plates 29 engage the cams 31. At that point, additional tension is taken in the chain 21 by the motor which causes the bolt 38 to pull the release plate 37 down toward the bottom of the channel 18 so that the forward ramp portion 39 of the release plate 37 pushes the latch shaft 33 away from the pivot point 15 and over the end of the channel 18 so that the latch is released. As continued tension is taken in the chain and after the latch shaft 33 has been released, the cam follower plates 29 begin to follow the arcuate ramp of the quadrant shaped cams 31 for pivoting the telescoping jack members toward the horizontal stow position as shown in FIG. 4. This motion continues until the stow shaft 26 rides over the upper end 44 of the stop ramp 43 at which time the stow shaft 26 catches on the upper edge 44 of the stow ramp. Retraction continues until such time as the stow shaft engages a microswitch 48 which interrupts the current to the reversible motor 20 and stops the stowing sequence. The self-stowing jack is then latched in the stowed position and is ready to initiate the next operating cycle.

I claim:
1. In an extendable and retractable jack:
a pair of jack means arranged for movement lengthwise relative to each other to effect telescopic extension and retraction thereof;
reversible drive means for reversibly driving one of said jack means lengthwise relative to the other;
pivot means for pivotably affixing said jack means to a vehicle to be lifted;
self-stowing means operatively associated with at least one of said jack means and mechanically operatively responsive to telescopic retractive movement of said pair of jack means for pivoting said pair of jack means about said pivot means into a stowed position; and
2. The apparatus of claim 1 wherein said reversible drive means includes motorized reversible drive means.
3. The apparatus of claim 1 including self-latching means disposed in mechanically operative association with said jack means and being mechanically operatively responsive to retractable movement of said jack means for latching said pair of jack means in the stowed position.
4. The apparatus of claim 1 including self-latching means operatively associated with said pair of jack means and being mechanically operatively responsive to pivotable movement of said pair of jack means out of the stowed position into a lifting position for latching said pair of jack means in the lifting position.
5. The apparatus of claim 4 including, release means mechanically operatively responsive to retractive movement of said pair of jack means for releasing said self-latching means to permit said jack means to pivot about said pivot means in response to operation of said self-stowing means.
6. The apparatus of claim 4 including release means mechanically operatively responsive to engagement of said cam means and cam follower means to produce a reactive force on said self-latching means for releasing said self-latching means to permit said jack means to pivot about said pivot means in response to operation of said self-stowing means.

7. The apparatus of claim 2 wherein said reversible motorized means is fixedly mounted to a first one of said jack means for telescopic movement therewith relative to said second one of said pair of jack means, said reversible drive means including an elongated flexible strand means extending lengthwise of said second one of said jack means, said strand being captured at axially spaced regions thereof to said second one of said jack means, and said reversible drive means including means for engaging said strand means and for traveling therealong to effect telescopic movement of said first and second jack means.

8. The apparatus of claim 1 wherein said cam means includes an arcuate cam track portion to be engaged by said cam follower means and wherein said cam follower means includes a cam follower portion for operative engagement with said arcuate cam track portion and for following along said arcuate cam track portion in response to operative retractive engagement of said cam and cam follower means.

* * * * *

PO-1050
(5/69)

UNITED STATES PATENT OFFICE
CERTIFICATE OF CORRECTION

Patent No. 3,984,082                               Dated October 5, 1976

Inventor(s) Richard W. Boettcher

It is certified that error appears in the above-identified patent and that said Letters Patent are hereby corrected as shown below:

Claim 1, Column 4, line 43, After "and" insert the following sub-paragraph:

said self-stowing means including cam means for providing a cam track, cam follower means being arranged for mounting to at least one of said jack means produces relative movement of said cam follower means and said cam track one along the other causing said pair of jack means to be pivoted about said pivot means into said stowed position.

Signed and Sealed this

Twenty-fifth Day of January 1977

[SEAL]

Attest:

RUTH C. MASON
*Attesting Officer*

C. MARSHALL DANN
*Commissioner of Patents and Trademarks*